[19] United States Patent
Seike

[11] 4,428,921
[45] Jan. 31, 1984

[54] PROCESS FOR RECOVERY OF SULFUR FROM $SO_2$-CONTAINING GAS

[75] Inventor: Yasuhiko Seike, Odawara, Japan

[73] Assignee: Sumitomo Heavy Industries, Ltd, Tokyo, Japan

[21] Appl. No.: 317,382

[22] Filed: Nov. 2, 1981

[30] Foreign Application Priority Data

Nov. 5, 1980 [JP] Japan ............... 55-155313

[51] Int. Cl.$^3$ ............... C01B 17/04
[52] U.S. Cl. ............... 423/569; 423/574 R; 422/110; 422/111; 436/119
[58] Field of Search ............... 423/574 R, 574 G, 571, 423/576, 567 R, 569, 570; 422/110, 111; 436/119, 122

[56]  References Cited
U.S. PATENT DOCUMENTS

| Re. 28864 | 6/1976 | Andral et al. | 422/110 |
| 3,904,370 | 9/1975 | Robison | 423/574 R |
| 3,985,864 | 10/1976 | Vautrain et al. | 423/574 R |
| 4,341,753 | 7/1982 | Mori et al. | 423/574 R |

FOREIGN PATENT DOCUMENTS 741412 11/1969 Belgium ............... 423/574 R

Primary Examiner—Gregory A. Heller
Attorney, Agent, or Firm—Murray & Whisenhunt

[57] ABSTRACT

A process for recovery of sulfur from $SO_2$-containing gas which comprises the steps of supplying said $SO_2$-containing gas mixed with additional oxygen to a $SO_2$ reduction reactor filled with solid carbonaceous materials for reducing part of the $SO_2$ into $H_2S$, a vaporous sulfur and COS; separating said vaporous sulfur by condensation from an effluent gas coming from this $SO_2$ reduction reactor to thereby produce a first gaseous mixture; supplying this first gaseous mixture to a Claus reactor to further produce a vaporous sulfur by Claus reaction; separating said vaporous sulfur by condensation from an effluent gas coming from this Claus reactor to thereby produce a second gaseous mixture; measuring the concentrations of $SO_2$ and $H_2S$ in this second gaseous mixture and further the concentration of COS as occasion demands; and controlling the amount of oxygen supplied to the $SO_2$-containing gas introduced into said $SO_2$ reduction reactor in accordance with said measured concentrations, thereby maintaining the $H_2S/SO_2$ molar ratio or $(H_2S+COS)/SO_2$ molar ratio of said first gaseous mixture at a level of about 2.

2 Claims, 3 Drawing Figures

PROCESS FOR RECOVERY OF SULFUR FROM $SO_2$-CONTAINING GAS

BACKGROUND OF THE INVENTION

This invention is broadly concerned with a process for recovery of sulfur from $SO_2$-containing gas by the concurrent use of a $SO_2$ reduction reactor and a Claus reactor, in particular a process for recovery of sulfur wherein the $H_2S/SO_2$ molar ratio or $(H_2S+COS)/SO_2$ molar ratio of the gaseous mixture introduced into the Claus reactor is maintained at a level of about 2 by controlling the amount of oxygen supplied to the $SO_2$-containing gas introduced into the $SO_2$ reduction reactor in accordance with the $SO_2$, $H_2S$ and $COS$ concentrations of the effluent gaseous mixture from the Claus reactor.

Claus process is known from old times as a process for production of an elemental sulfur. This Claus process comprises supplying $H_2S$ and $SO_2$ to a Claus reactor packed with a catalyst such as alumina to thereby bring about a reaction: $2H_2S + SO_2 \rightarrow 3S + H_2O$ and recovering an elemental sulfur from the gas resulting from this reaction. In the case of this process, the most essential requisite for yielding sulfur at a maximum efficiency is to maintain the $H_2S/SO_2$ molar ratio in the inlet gas of Claus reactor at a level of 2.

Accordingly, when recovering sulfur from exhaust gas using Claus reaction in petroleum refining industry, considering that said exhaust gas contains $H_2S$ there is adopted an elaborate means for controlling the $H_2S/SO_2$ molar ratio in the gas supplied to the Claus reactor to be at a level of 2, for instance, of arranging a conversion furnace on the upstream side of the Claus reactor and converting a part of $H_2S$ contained in the exhaust gas into $SO_2$ by the oxidation reaction of oxygen (air) $(H_2S + 3/2O_2 \rightarrow SO_2 + H_2O)$ within said conversion furnace.

As the process for recovering sulfur from $SO_2$-containing gas coming from the activated carbon regenerator or the like of the dry exhaust gas desulfurization plants there has hitherto been employed a process comprising introducing said $SO_2$-containing gas into the $SO_2$ reduction reactor using carbonaceous particles such as coal, coke or the like as a reducing agent to thereby reduce $SO_2$ into a vaporous sulfur and separating said sulfur by condensation. However, this process involves problems to be solved such that the sulfur recovery efficiency is not necessarily high.

U.S. patent application Ser. No. 172,590, filed July 28, 1980, now abandoned by Teruo Watanabe and Kazuhiko Yamamoto and assigned to the assignee of the present invention discloses a process for recovering sulfur from $SO_2$-containing gas by the arrangement of a Claus reactor on the downstream side of a $SO_2$ reduction reactor and by joint use of $SO_2$ reduction and Claus reactions. To sum up, this process for recovering sulfur comprises the steps of first introducing $SO_2$-containing gas into a $SO_2$ reduction reactor for reducing part of $SO_2$ into $H_2S$, a vaporous sulfur and $COS$, condensing the effluent gas from said $SO_2$ reduction reactor to thereby separate sulfur, thereafter mixing the residual gas with additional $SO_2$-containing gas and introducing the resulting mixture into a Claus reactor, newly producing a vaporous sulfur within said Claus reactor, and thereafter condensing the effluent gas from the Claus reactor to thereby separate sulfur therefrom. The important factor in carrying out this process is to maintain the $H_2S/SO_2$ molar ratio or $(H_2S+COS)/SO_2$ molar ratio of the gas mixture introduced into the Claus reactor (which will be referred to as Claus ratio hereinafter) at a level of about 2. For that purpose, there is necessity of controlling the temperature distribution within said $SO_2$ reduction reactor properly so that the composition of effluent gas from the $SO_2$ reduction reactor may not vary widely. However, the fact is that this temperature control is not necessarily easy technically. In addition thereto, it is usual that the residual gas after removal of sulfur by condensing the effluent gas from the $SO_2$ reduction reactor is mixed with a part of $SO_2$-containing gas by-passed from said gas to be introduced into the $SO_2$ reduction reactor in order to maintain the Claus ratio of two at the inlet of the Claus reactor. Since this $SO_2$-containing gas generally contains dust, it becomes difficult to ensure maintenance and reliability of instruments for use in controlling the flow rate of said by-passed gas.

SUMMARY OF THE INVENTION

This invention provides a process for recovery of elemental sulfur from $SO_2$-containing gas using a $SO_2$ reduction reactor and a Claus reactor disposed on the downstream side thereof, wherein the amount of oxygen supplied to the $SO_2$-containing gas introduced into the $SO_2$ reduction reactor is controlled in accordance with the concentrations of $SO_2$, $H_2S$ and $COS$ in the effluent gas from the Claus reactor, thereby maintaining the Claus ratio of the gaseous mixture introduced in the Claus reactor at a level of about 2.

In other words, this invention provides a process for recovery of sulfur from $SO_2$-containing gas which comprises the steps of:

(a) introducing a $SO_2$-containing gas mixed with additional oxygen into a $SO_2$ reduction reactor filled with solid carbonaceous materials for reducing part of $SO_2$ into $H_2S$, a vaporous sulfur and $COS$ and separating said vaporous sulfur therefrom by condensation to thereby recover an elemental sulfur;

(b) introducing a first gaseous mixture containing $H_2S$, $COS$ and unreacted $SO_2$ after separation of said vaporous sulfur into a Claus reactor to further produce a vaporous sulfur by Claus reaction; and (c) introducing an effluent gas from the Claus reactor into a second condenser for separating a vaporous sulfur therefrom by condensation to further recover an elemental sulfur and discharging the second gaseous mixture after separation of said vaporous sulfur to the outside of the system, characterized by measuring the concentrations of $SO_2$ and $H_2S$ contained in said second gaseous mixture and further the concentration of $COS$ contained therein as occasion demands for controlling the amount of oxygen supplied to the $SO_2$-containing gas referred to in the preceding step (a) in accordance with the measured concentrations to thereby maintain the $H_2S/SO_2$ molar ratio or $(H_2S+COS)/SO_2$ molar ratio of said first gaseous mixture at a level of about 2.

DESCRIPTION OF THE PREFERRED EMBODIMENT

The SO$_2$-containing gas typically used in this invention is the regenerated gas from the activated carbon regenerator of the dry exhaust gas desulfurization plants. The supply of oxygen to this SO$_2$-containing gas is generally carried out by using air. As the SO$_2$ reduction reactor there may be employed a reactor of the same type as those having usually been utilized for recovering sulfur from the SO$_2$-containing gas. The reactor is charged with carbonaceous particles such as coal or coke normally in the form of a moving bed. The SO$_2$-containing gas contacts with this moving bed in a countercurrent manner. The temperature of the moving bed, though variable depending on the amount of oxygen supplied, should be more than 800° C. in order to ensure the conversion of SO$_2$ into H$_2$S. In order to prevent the excessive burning loss of carbonaceous particles forming the moving bed, on the other hand, it is preferable to maintain the temperature of the moving bed below 1000° C. Thus a vaporous sulphur and H$_2$S containing gas flows out of the SO$_2$ reduction reactor. This effluent gas contains an unreacted SO$_2$ in addition to H$_2$S and the vaporous sulfur, and contains further COS according to circumstances. Accordingly, by introducing the effluent gas from the SO$_2$ reduction reactor into a condenser and separating the vaporous sulfur therefrom by condensation there can be obtained a first gaseous mixture containing SO$_2$ and H$_2$S, and further COS according to circumstances. This first gaseous mixture is then supplied to the Claus reactor. As the Claus reactor there may be utilized a reactor packed with a normal Claus catalyst such as alumina, titania or the like.

The most important feature of the process according to this invention is to measure the concentrations of SO$_2$ and H$_2$S contained in the residual gas after having separated the vaporous sulfur by condensation from the effluent gas from the Claus reactor and further the concentration of COS contained therein as occasion demands, and controlling the amount of oxygen supplied to the material SO$_2$-containing gas at the inlet of the SO$_2$ reduction reactor in accordance with said measured concentrations, thereby maintaining the Claus ratio of the gas introduced in the Claus reactor at a level of about 2. This operation can be carried out automatically by using conventional measuring instruments and controllers. For instance, the control system consisting of gas analyzer, a Claus ratio control unit using a computer and an air flow rate controller makes it possible to maintain the Claus ratio of the gas introduced in the Claus reactor at a level of about 2 automatically.

Figure 1:
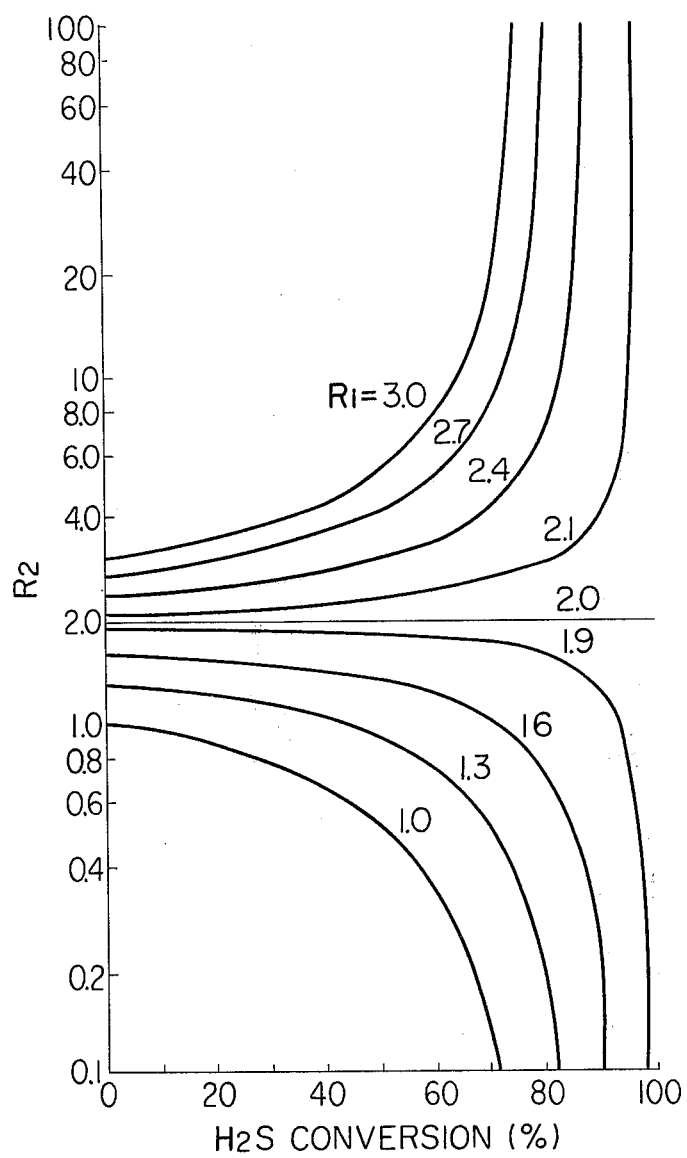
FIG. 1 is a graph illustrating the relationship between the Claus ratio of gas at the inlet of the Claus reactor and that of gas at the outlet of said reactor.

In the Claus reactor, the production yield of sulfur is controlled and the Claus ratio of the gas at the outlet of the reactor also varies depending on the Claus ratio of the gas at the inlet of the reactor. This relationship is evident from the equilibrium calculation results of the Claus reaction illustrated in FIG. 1, that is, when the Claus ratio (R$_1$) of the inlet gas is more than 2, the Claus ratio (R$_2$) of the outlet gas is amplified into a greater value, and contrarily when the Claus ratio of the inlet gas is less than 2, the Claus ratio of the outlet gas is reduced into a less value. And, it is only when the Claus ratio of the inlet gas is 2 that the Claus ratio of the outlet gas is 2. This leads to the result that in accordance with the increase in the number of Claus reactor, the Claus ratio of the tail gas is markedly amplified as the Claus ratio of the inlet gas deviates from 2. In this invention, the concentrations of H$_2$S, SO$_2$ and COS of the outlet gas (or tail gas) in the Claus reactor are measured continuously and the Claus ratio is calculated therefrom for Claus ratio controlling purposes. This is made with the intention of utilizing the detected data where Claus ratio is reflected most sharply after the passage of Claus reaction as a control variable, which is extremely effective for the purpose of controlling the Claus ratio at the inlet of the Claus reactor at an optimum value.

Figure 2:
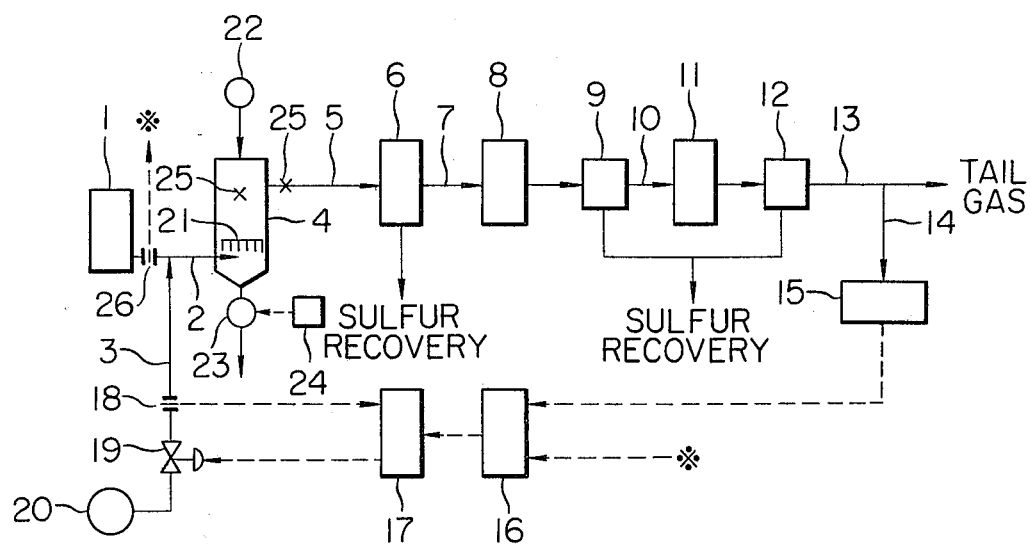
FIG. 2 is a flow sheet illustrating one embodiment of this invention.

Next, explanation will be made on one embodiment of this invention with reference to FIG. 2. The SO$_2$-containing gas coming from a SO$_2$-containing gas generating source 1, namely, the activated carbon regenerator of the dry exhaust gas desulfurization plants passes through a line 2, is supplied with air (oxygen) from a line 3 and introduced into a moving bed type SO$_2$ reduction reactor 4, and is dispersed uniformly by a distributor 21 within the reactor. In the SO$_2$ reduction reactor 4, the SO$_2$-containing gas supplied with oxygen is made to contact with a moving bed of carbonaceous particles such as coal, coke in a countercurrent manner by the operation of coal supply apparatus 22 and coal transport/discharge apparatus 23.

Within the SO$_2$ reduction reactor 4, a part of carbonaceous particles is burnt by the oxygen to create a predetermined reaction temperature and thus SO$_2$ is reduced into a vaporous sulfur in accordance with the following reaction formula: $C+SO_2 \rightarrow S+CO_2$. Further, the steam and CO$_2$ contained in the SO$_2$-containing gas and the CO$_2$ produced by burning of carbonaceous paticles cause the following reactions to produce CO and H$_2$, and these substances react with once produced sulfur to by-product H$_2$S and COS:

$$C+CO_2 \rightarrow 2CO$$

$$C+H_2O \rightarrow CO+H_2$$

$$2H_2+S_2 \rightarrow 2H_2S$$

$$2CO+S_2 \rightarrow 2COS$$

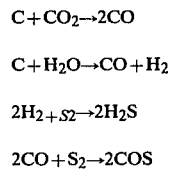

Accordingly, the gas containing vaporous sulfur H$_2$S, COS and unreacted SO$_2$ flows in a line 5 from the SO$_2$ reduction reactor 4. This effluent gas is introduced into a condenser 6 where said vaporous sulfur is separated by condensation. And, the gaseous mixture obtained at this time is thence introduced into the Claus reactor through a line 7 for the purpose of further recoverying sulfur therefrom.

According to this embodiment, two Claus reactors are installed. The gaseous mixture passed through the condenser 6 is introduced from the line 7 into the first Claus reactor 8 where H$_2$S and SO$_2$ are converted into a vaporous sulfur by the Claus reaction (2H$_2$S+SO$_2 \rightarrow$3S+H$_2$O), while COS is converted into H$_2$S by the following hydrolysis reaction: COS+H$_2$O$\rightarrow$H$_2$S+CO$_2$, and this H$_2$S is placed at the service of Claus reaction. The effluent gas from the first Claus reactor 8 is fed to a condenser 9 where the vaporous sulfur is separated therefrom by condensation, and thereafter the residual gas containing $H_2S$, $SO_2$ and COS is introduced into the second Claus reactor 11 through a line 10. Within the second Claus reactor there also take place the same reactions as the first Claus reactor, and the vaporous sulfur-containing gas generated herein is supplied in a condenser 12. In the condenser 12, the vaporous sulfur is separated by condensation, and the residual gas thus obtained is guided into a tail gas line 13 and is treated safely to protect environment.

In this connection, it is to be noted that although this embodiment refers to the case where two Claus reactors are installed, this invention naturally may use one or three or more Claus reactors. However, in either case it will be preferable to maintain the gas temperature at the inlet of the Claus reactor at an optimum temperature suitable for Claus reactions taking place in each reactor.

According to the process of this invention, the Claus ratio of the gaseous mixture in the line 7 and line 10, namely, at the inlet of each Claus reactor can be maintained at a level of about 2 in the followinng manner. That is, the sample gas sampled from the tail gas line 13 by means of a sampling unit of a gas analyzer is introduced in a gas analyzer 15 where the $H_2S$ concentration, $SO_2$ concentration and COS concentration, which are necessary for calculating the Claus ratio, are measured continuously. And, these measured values are sent to a Claus ratio computer control unit 16 in the form of electric signals. The Claus ratio computer control unit 16 acts to check that the gas analyzer is normal on the basis of the values measured by the gas analyzer, thereafter calculate the Claus ratio at the present time and thus compute the amount of oxygen supplied to the $SO_2$ reduction reactor 4 that is required for controlling the Claus ratio of the tail gas at a level of about 2, and send the obtained results to an air flow rate controller 17 in the form of electric signals. In order to control the air flow rate at the set point sent from the Claus ratio computer control unit 16, the air flow rate controller 17 operates the control the amount of air supplied from an air supply apparatus 20 on the basis of measured value sent from an air flow meter 18 by means of an air flow rate control value 19. In this instance, it is preferable to preheat the air supplied from the air supply apparatus 20 in the vicinity of the temperature of the $SO_2$-containing gas in the line 2.

Figure 3:
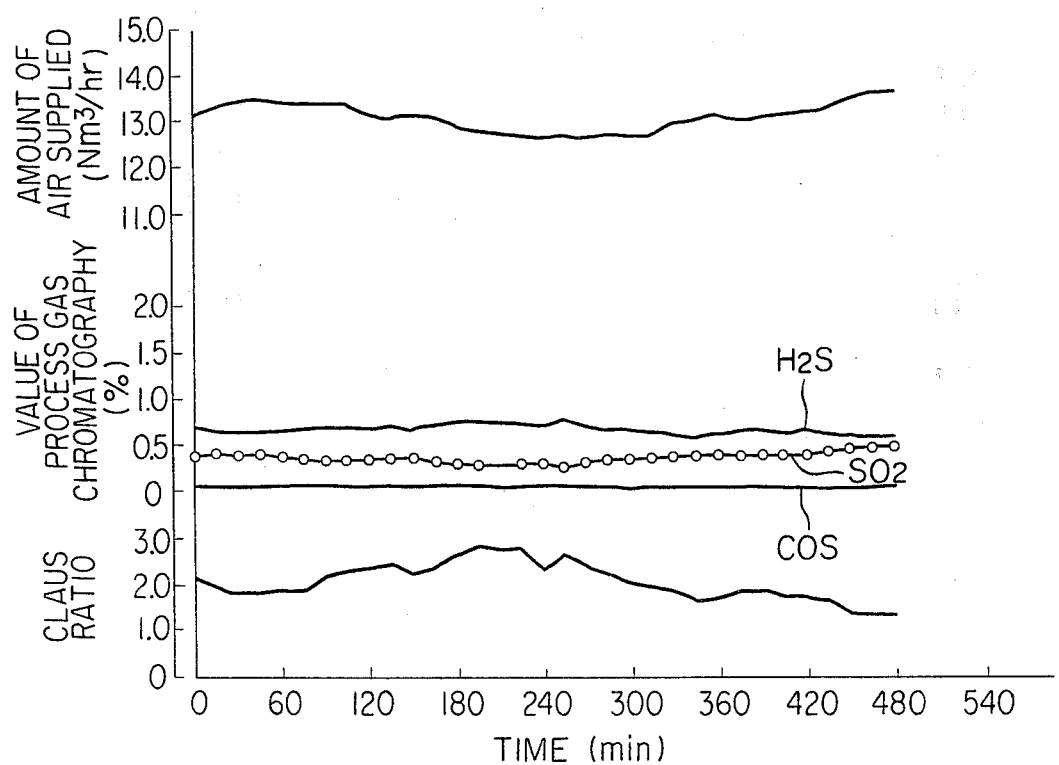
FIG. 3 is a graph illustrating the relationship between the Claus ratio, gas concentration at the effluent of the second Claus reactor and amount of air supplied to the SO$_2$ reduction reactor in said embodiment.

By thus controlling the composition of gas flowing through the line 5, it is made possible to maintain the Claus ratio of gas supplied to the following Claus reactors at a level of about 2, one instance of which may be illustrated as shown in FIG. 3.

In this connection, it is to be noted that for the purpose of ensuring safe practice of the process according to this invention, it is preferable to provide the Claus ratio computer control unit 16 with an output limiter for setting the upper and lower limits of the amount of air supplied in addition to its function of checking abnormality of the gas analyzer, and further to install, in the $SO_2$ reduction reactor 4 or line 5, a thermometer 25 for detecting abnormality in the reactor temperature together with a coal transport/discharge control apparatus 24 capable of changing the amount of coal transported in case where the reactor temperature becomes abnormal.

Further, it is desirable to install a gas flow meter 26 in the line 2 and incorporate in the Claus ratio computor control unit 16 a feed forward control loop for previously controlling the amount of air supplied at a proper amount in case where a rapid change occurs in the amount of the $SO_2$-containing gas.

As is evident from the aforegoing, the process according to this invention can maintain the Claus ratio of gas introduced in the Claus reactor at a level of about 2 continuously because said process is designed to control the amount of oxygen (air) supplied to the $SO_2$ reduction reactor depending on the concentrations of $H_2S$, $SO_2$ and COS contained in the outlet gas of the Claus reactor. In the case of this invention, furthermore, there is no special necessity for worrying about the reliability and maintenance of instruments for use in the practice of this invention such as gas analyzer, oxygen (air) flow meter, control valve, controller and the like even in the case of treating a dust-containing gas, namely, $SO_2$-containing gas, because these instruments have long been put to practical use.

In this connection, it is to be noted that the case where the $H_2S/SO_2$ ratio is equal to 2 means the case where the amount of COS generated is relatively little and substantially uniform.

I claim:

1. In a process for recovery of sulphur from an $SO_2$-containing gas which comprises the steps of:
   (a) introducing an $SO_2$-containing gas mixed with additional oxygen into an $SO_2$ reduction reactor filled with solid carbonaceous materials so as to reduce a portion of the $SO_2$ and form $H_2S$, vaporous sulphur and COS, and separating said vaporous sulphur therefrom by condensation to form a first gaseous mixture and to thereby recover elemental sulphur;
   (b) introducing said first gaseous mixture into a Claus reactor to further produce a vaporous sulphur by Claus reaction; and
   (c) introducing the effluent gas from the Claus reactor to a condenser for separating vaporous sulphur therefrom by condensation to form a second gaseous mixture and to thereby further recover elemental sulphur, and discharging the second gaseous mixture to the outside of the system; the improvement comprising measuring the concentration of $SO_2$, $H_2S$ and COS contained in said second gaseous mixture; computing the $(H_2S+COS)/SO_2$ molar ratio on the basis of said measured concentrations; and controlling the amount of oxygen supplied to the $SO_2$-containing gas of step (a) in accordance with the computed molar ratio to maintain the $(H_2S+COS)/SO_2$ molar ratio of said first gaseous mixture at a level of about 2.

2. The process according to claim 1, wherein the improvement further comprises including a feed forward control loop for measuring the flow rate of the $SO_2$-containilng gas introduced into the $SO_2$ reduction reactor and controlling on rapid change in the amount of said gas, the amount of oxygen supplied at a previously set value in relation to the varied amount.

* * * * *